(12) United States Patent  
Antonios et al.

(10) Patent No.: US 7,804,953 B1  
(45) Date of Patent: Sep. 28, 2010

(54) REDIRECTION OF OUTBOUND CALLING

(75) Inventors: Medhat N. Antonios, Marlboro, NJ (US); George H. Martin, Phillipsburg, NJ (US); Anisa Parikh, Holmdel, NJ (US); Darri Picoult-Hart, Freehold, NJ (US)

(73) Assignee: AT&T Intellectual Property II, LP, Reno, NV (US)

( * ) Notice: Subject to any disclaimer, the term of this patent is extended or adjusted under 35 U.S.C. 154(b) by 1015 days.

(21) Appl. No.: 11/550,664

(22) Filed: Oct. 18, 2006

Related U.S. Application Data

(60) Provisional application No. 60/754,651, filed on Dec. 30, 2005.

(51) Int. Cl.  
*H04M 3/00* (2006.01)

(52) U.S. Cl. .................... 379/266.08; 370/218
(58) Field of Classification Search ............ 379/266.08, 379/266.07, 265.09; 370/218  
See application file for complete search history.

(56) References Cited

U.S. PATENT DOCUMENTS

| | | | | |
|---|---|---|---|---|
| 5,414,754 | A * | 5/1995 | Pugh et al. ............... | 379/88.23 |
| 6,445,776 | B1 * | 9/2002 | Shank et al. ............... | 379/88.1 |
| 7,016,348 | B2 * | 3/2006 | Laursen et al. ............. | 370/389 |
| 7,149,287 | B1 * | 12/2006 | Burger et al. ............ | 379/88.17 |
| 2003/0051037 | A1 * | 3/2003 | Sundaram et al. .......... | 709/227 |
| 2006/0245574 | A1 * | 11/2006 | Phelps et al. ............... | 379/229 |
| 2007/0038499 | A1 * | 2/2007 | Margulies et al. ............ | 705/9 |
| 2007/0237175 | A1 * | 10/2007 | Benedyk et al. ............ | 370/467 |

* cited by examiner

*Primary Examiner*—Creighton Smith  
(74) *Attorney, Agent, or Firm*—Greenblum & Bernstein, P.L.C.

(57) ABSTRACT

Outbound calls are processed in a telecommunications network. Schedule service data associated with network terminating addresses is stored in a memory of a content platform. During a connectivity session between the content platform and a first media platform configured for interactive voice response for outbound calling, available outbound port capacity of the first media platform is determined at the content platform. If the outbound port capacity of the first media platform is not available, a request for redirecting outbound calling capacity from a first outbound call production platform to a second outbound call production platform is transmitted to an outbound calling scheduler.

22 Claims, 7 Drawing Sheets

REDIRECTION OF OUTBOUND CALLING

This application claims priority to provisional U.S. Application Ser. No. 60/754,651, filed Dec. 30, 2005, herein incorporated by reference as to its entire contents.

FIELD OF THE INVENTION

The technical field generally relates to telecommunications services, and, more particularly, to a method and system for providing outbound calling services for making network-based calls and for redirecting outbound calling services from one server to another server.

BACKGROUND

Traditional outbound call management equipment is used for any number of purposes, for example, to take surveys to determine customer satisfaction, to seek political opinions, to do market research, to offer for sale products and services, to do fund-raising activities or for other purposes. These uses and applications are merely exemplary and the uses of such outbound call management equipment are only limited by the imagination of its users or customers.

Traditional outbound call management equipment involves the automatic dialing of a list of target telephone numbers. The target telephone numbers may be those of previous customers, clients, a random sample of the public at large, members of political parties or previous donors to a charity in keeping with the examples given above. Serving outbound call management equipment may be located in the same local exchange or the outbound call service area may involve wide area telephone service or long distance communications. The called target parties who answer the calls may be directed to live agents immediately upon answer or after a period of time during which the called party may interact with the system (having query, response capability, such as interactive voice response capability as further discussed herein) to respond to some basic questions. Consequently, depending on the sophistication of known outbound call management systems, there may come a point in time when there is a need to speak with a live agent who then interacts with the target called parties, typically at a call distribution service position station.

A telecommunications services customer (such as a charity or a polital party) seeking such outbound call management services presently has two alternatives involving a live service representative. The customer can purchase expensive outbound call management hardware and software themselves and/or associate the equipment and hardware with their own private telephone system. But they must hire their own agents to speak with target called parties and perform their own system design. The customer's other alternative is to use the services of a special service bureau or services provided by a telecommunications service provider such as a local or toll common carrier which has already obtained requisite hardware and software and hired live agents to converse with target called parties. Both of these service alternatives may be unsatisfactory for many outbound call telephone service customers. The cost of the hardware and software needed to effectuate outbound call management can be prohibitive, for example, for an individual or a small charitable organization and may involve the costs of the use of live agents to converse with target called party queries.

Recently, interactive voice response services have been introduced which to some extent alleviate problems with known outbound call management systems. Outbound calling is a feature that may be provided by such interactive voice response (IVR) service providers to their customers. Inbound calling is also a feature that may be provided by IVR service providers. For example, a large commercial bank may provide IVR inbound calling services to their banking customers to check the status of their bank accounts. Interactive voice response systems typically involve speech recognition and natural language understanding algorithms. The need for a live service agent may be diminished or even eliminated for many typical outbound (or inbound) calls. In inbound systems, generally, it has been found that callers to the system are desirous of receiving the information the system offers. Consequently, there is little or no concern in in-bound systems of anyone intentionally trying to tie up the system.

On the other hand, in outbound IVR systems, targeted called parties tend to treat the calling system as an unwanted call. There may be a delay in connecting the IVR equipment to the caller. The caller may recognize the connection delay as indicating an unwanted call and hang up. The caller identification data for a call to a target called party may warn the party that the call is not one from a friend or family member. If the target called party answers, there may be a tendency of the called party if they do not like the call to intentionally cause the outbound calling service provider to expend unnecessary resources in time, equipment and live agent resources. On the other hand, many target called parties will immediately hang up when reached which may be an indicator of an unsuccessful approach or the selection of a target audience that is not appropriate.

When provided by a common carrier via a telecommunications network, for example, AT&T Corp. provides VoiceTone™ IVR services, the advantages of decreasing the costs, for example, of providing a large number of agents and the costs of equipment may be shared among several users of the IVR service. However, whether outbound calling services are provided by IVR service providers, by customers purchasing their own equipment or by customers' using a service bureau, there may come a time when service may need to be provided via a replacement site, for example, for routine scheduled maintenance or in the event of an equipment failure or natural or other disaster. There are situations when outbound calling traffic needs to be redirected from one outbound calling production site, for example, of the IVR service provider, the customer site or the service bureau to another server site, in order to provide twenty four hour per day, seven day per week support for an outbound calling service capability. "Server" as used herein may be used interchangeably with the term "platform." Examples of situations requiring switching to an alternative site include: one site goes into a scheduled maintenance mode, problems are encountered on the platform/server at a site, network connection failures occur due to breakdown of equipment at intermediate sites between the provider and the called party, there is a natural disaster such as an earthquake, weather related calamity or fire at the original site, the traffic handling capacities at one site reach extreme limits where either the IVR equipment or number of agents becomes taxed such that outbound services cannot be provided efficiently or other examples only limited by the imagination. While some service bureaus provide for alternative service bureau sites, any switching of services to an alternative site or sharing of service provision with the alternate site is limited and may be predetermined. For example, there may be service bureau locations across the United States and around the world in different time zones to handle overflow or to provide additional live agents at different times of the day. But the amount of traffic carrying capacity, viewed either in terms of time of day of availability or service carrying ability of equipment or agent resources during a given time of day, may be limited and predetermined. There are difficulties in switching from one site to another to be sure that the new site is equipped with software, facilities and trained personnel to handle the particular service area of the target population of the target called parties of the outbound system to be turned down or to receive temporary relief but remain active.

Consequently, there is an urgent need to provide an economical outbound call management apparatus and procedures accessible to a wide spectrum of those who use outbound telecommunications calling services which can redirect outbound calling services to another site when necessary.

SUMMARY OF THE INVENTION

One embodiment of an outbound call redirection method and apparatus pertains to a system and method of outbound call redirection for a telecommunications network that is capable of transferring data and application software to an alternative site in accordance with a predetermined schedule or, for example, when a detectable potentially disastrous event occurs. The embodiment discussed herein may likewise apply to inbound calling IVR services and the scope of at least one aspect should not be considered limited by an inbound or outbound direction of calling.

Aspects of the present invention provide a tool that supports redirection of the outbound calling capability from one outbound call production site to a replacement site within the network. A call redirection tool is implemented via a set of scripts that can be preferably executed automatically (or manually). When a site supporting the outbound calling capability goes into a switchover mode, for example, at a predetermined time of day for a scheduled maintenance on a platform, the scripts execute automatically and switch over the outbound calling capability to the replacement site within the network. Further outbound calls are made from the replacement site in the switchover, for example, until the scheduled maintenance period is over or until a second later predetermined time of day. Frequently, the equipment switchover needs not involve all resources associated with outbound calling such as live agent resources at call distribution positions. For example, when a first outbound calling server is switched over to a second outbound calling server so the first outbound calling server may receive routine maintenance, the links to live agent service positions may be transparently switched to the second outbound calling server so that the pool of live agents need not be changed.

In another aspect, if there are failures in one outbound calling production site where the outbound calling capability is active, a tool provides scripts that can be executed in order to switch over the outbound calling capability to the replacement site within the network responsive to the detection of the failures (or an impending natural disaster or fire). In the instance of a natural disaster such as a hurricane, it is desirable to provide both an outbound calling server and a pool of live agents and associated call distribution positions within the same time zone but outside the zone of the natural disaster. In accordance with this aspect, the outbound call management system may detect the equipment failure (or an impending disaster or fire) and effectuate a switchover. Once troubles causing the failures are cleared and remedial measures are taken, the outbound calling capability may be switched back to the original site.

In one other aspect, there is provided a capability for the continuous evaluation of real-time service performance criteria against predetermined thresholds, an exceeding of which or failure to meet can automatically trigger a switch over of at least a portion of the outbound calling tasks to an alternate site. The automatic evaluation of real-time service performance criteria presumes the detection, storage and evaluation at an original site of parameters such as number of rings before answer, number of immediate hang-ups as soon as IVR equipment is connected, number of seconds of IVR and/or live agent call duration, number of simultaneous IVR and/or live agent calls, number of IVR calls reaching a service agent, number of hang-ups by called parties within a number of seconds after reaching a service agent, number of times an illogical or incoherent response is received from a called party by IVR equipment, assessment of sequences of illogical IVR responses, and number of calls thrown to voicemail by called party terminal equipment and the identity of respective target called telephone numbers, among other service criteria. Each of these parameters may be selectively measured at an originating site and may depend on the application, from selling products to taking opinion surveys. Rates of increase/decrease in detected and measured parameters may be detected. A list of certain target called parties may be time-shifted to different times of the day and the identities of target called parties deleted from an ordered list, placed in different order or new target audiences added.

A fuzzy logic or other algorithm or process may evaluate originating site performance, call success criteria, call failure criteria and the like. In particular, traffic-based criteria may determine the need for a switchover of a portion of IVR outbound calling capability, for example, when call handling capability becomes diminished such that assistance is needed from a replacement site and/or additional live agents to maintain traffic handling performance criteria. In one embodiment, service monitoring platforms including service criteria monitoring software for monitoring a plurality of outbound call management systems are distributed about the world and may be redundant as to some or all systems monitored. In an alternative embodiment or in combination, an algorithm may be used at the service monitoring platform or at an outbound call management server (more likely, a content platform, but possibly, a media platform as further defined herein) to decide whether called parties are attempting to intentionally tie up the outbound call directing apparatus. Hereinafter, such a service criteria evaluation algorithm for deducing when called parties are intentionally causing system performance to suffer will be described as evaluating logically deduced call success/failure criteria to decide whether a switchover of some outbound calling tasks to a replacement site is appropriate. Alternatively, it may be deduced that the outbound calling approach to a target called party is inappropriate and changes may be made to a query/response IVR script used for a particular application, to a script used by a live agent, to modify the target called population or generally to improve outbound calling success. As in the case of a maintenance mode or equipment failure or disaster recovery, service criteria decision making may be applied separately to the IVR resources and to the live agent pool (both associated with a media platform as will be further described herein). Other real-time service performance criteria may come to mind of one of ordinary skill in the art for use in deciding when a switchover of some portion of outbound calling resource capacity is appropriate.

In one other aspect, two types of platforms team to perform outbound call management services: a content platform where data records of telephone numbers, the computer-readable code for application operation, service data for outbound calling and the like are permanently stored and, from the content platform, links are provided to a media platform which in turn connects to target called parties on the one hand and, as needed and programmed, to live agents of a live agent pool on the other. The content platform is primarily responsible for updating an outbound call management customer computer via links to the customer computer on a periodic basis. The media platform provides different functionality from the content platform. The media platform interfaces with an IVR system and/or provides links to live agents to accomplish multi-media outbound calling via a telephone/multimedia gateway and contains, for example, a voice XML interpreter and local disk caching. A media platform typically records call statistics on a temporary basis per application and passes such statistics to the content server for interpretation and decision making. As used in the claims, "platform" should be considered broadly defined to include and not be limited to including a server, a computer, a controller, a terminal and any requisite software for controlling their operation and include any other device and associated software that performs the functions described and attributable to a "platform" as recited in the claims.

Consequently, in accordance with this aspect of dividing outbound calling control and calling responsibilities between a content platform and a media platform, there is provided a method of outbound telecommunications voice call processing, comprising the steps of: in a first content platform configured for an interactive voice response system for outbound calling in a telecommunications network, retaining a plurality of schedule service data associated with a plurality of network terminating addresses for controlling outbound voice call processing in a telecommunication network in accordance with a first outbound calling application; establishing a connectivity session to a second content platform configured for outbound voice call processing control in the telecommunications network; transmitting a computer readable instruction, such as a command, to the second content platform during the connectivity session so as initiate outbound calling control functions locally thereon for the first application; transmitting electronically at least a portion of the schedule service data to the second content platform for the first application; and using the electronically transmitted schedule service data and resident schedule service data and scripts associated with the second content platform to perform outbound calling control in the telecommunications network for the first application. A switchover from a first content server to a second content server of a portion or all schedule service data may be temporary and occur after an expected or unexpected event occurs and is detected or for a predetermined period of time or until real-time service performance criteria as evaluated against thresholds predetermined for the application return to normal boundaries. Moreover, the switchover from the first content server to the second content server may include a transparent transfer of links to a first media platform having IVR resources and a gateway to live agent resources provided via the first media platform. In accordance with another aspect of the invention, responsibilities of both a first content server and a first media server may be switched over simultaneously or in tandem to a second content server and a second media server respectively. For example, a content platform/media platform pair or site may be turned down together for maintenance purposes or in the event of an expected or unexpected event or share responsibilities for outbound calling with another site to maintain service performance criteria.

In yet another aspect, there is provided a method of telecommunications voice call processing, comprising the steps of: in a content server configured for outbound calling control in a telecommunications network, retaining a plurality of schedule service data associated with a plurality of network terminating addresses for processing a voice call in a telecommunication network in accordance with a first application; responsive to detection of an event, establishing a connectivity session to a media server configured for an interactive voice response system for outbound calling in the telecommunications network; transmitting a command to the media server during the connectivity session so as to initiate outbound calling control functions locally thereon; transmitting electronically at least one of the schedule service data to the media server; and using the schedule service data formerly associated with the content server to perform outbound calling control in the telecommunications network until the content server is restored to operability. The media server thus may perform the outbound calling control responsibilities of the content server until a scheduled event occurs or for a predetermined period of time or until real-time service performance criteria returns to being within threshold boundaries.

It should be noted according to a related aspect that a first media server may transfer outbound calling responsibilities to another, second media server, both of which having links to a common or first content server. The shift in outbound calling responsibilities from the first media server to a second may be transparent to the live agent or to a called party as links, for example, between IVR equipment or live agents and target called parties may be set up as redundant and then links to the first media server torn down. On the other hand, it is believed impractical for a media server to transfer outbound calling responsibilities to a content server since the media server is responsible for the IVR and live agent resources and such resources are difficult to shift to a platform resource farther removed from the called party, an IVR system or a live agent.

In yet another aspect, the several different alternative decision processes (typically made at a content platform as defined above) that may be used to cause a switch of at least some schedule service data to a replacement outbound calling and control site from an original outbound calling and control site in a network results in the sharing of a common replacement site by a plurality of original sites. Thus a replacement outbound calling and control site may receive the responsibility for some schedule service data from a plurality of sites and operate differently depending on the different criteria used to make the switchover decision and continue to measure parameters and the like regarding service performance in accordance with temporarily transferred or permanently stored applications. For example, an outbound calling and control site in India may temporarily replace or perform some of the outbound calling and calling control functions of a plurality of sites in the United States, the Indian site providing 24/7 live agent, IVR and call control support via VoIP, shared long distance or other inexpensive links.

The several aspects thereof may be practiced with computer system configurations, including hand-held devices, multiprocessor systems, microprocessor-based or programmable consumer electronics, network personal communications service (PCS), minicomputers, mainframe computers and the like. Furthermore, aspects may also be practiced in distributed computing environments where tasks are performed by remote processing devices that are linked through a wireless or wired, virtual or physical link-based, electronic data, multimedia, internet or voice communications network.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention:

DETAILED DESCRIPTION OF THE INVENTION

The following embodiments and aspects thereof are described and illustrated in conjunction with systems tools and methods which are meant to be illustrative and non-limiting in scope. The embodiments and aspects are described with particular application in a telecommunications network environment such as in connection with the implementation of the automated AT&T VoiceTone services contact center, but the principles discussed herein may be equally applicable to IVR provider applications and live agent applications associated with an IVR provider, a service bureau or a private branch exchange. While voice embodiments are described, the principles may also be applicable to video/voice and multimedia environments, internet email messaging, wireless short text messaging and other known telecommunications and internet, wired or wireless, local or long distance, national or international messaging. The following description is divided into sub-sections to assist the reader. The sub-sections include: General System Environment, Operating Approach, and General Network Environment.

General System Environment

Figure 1:
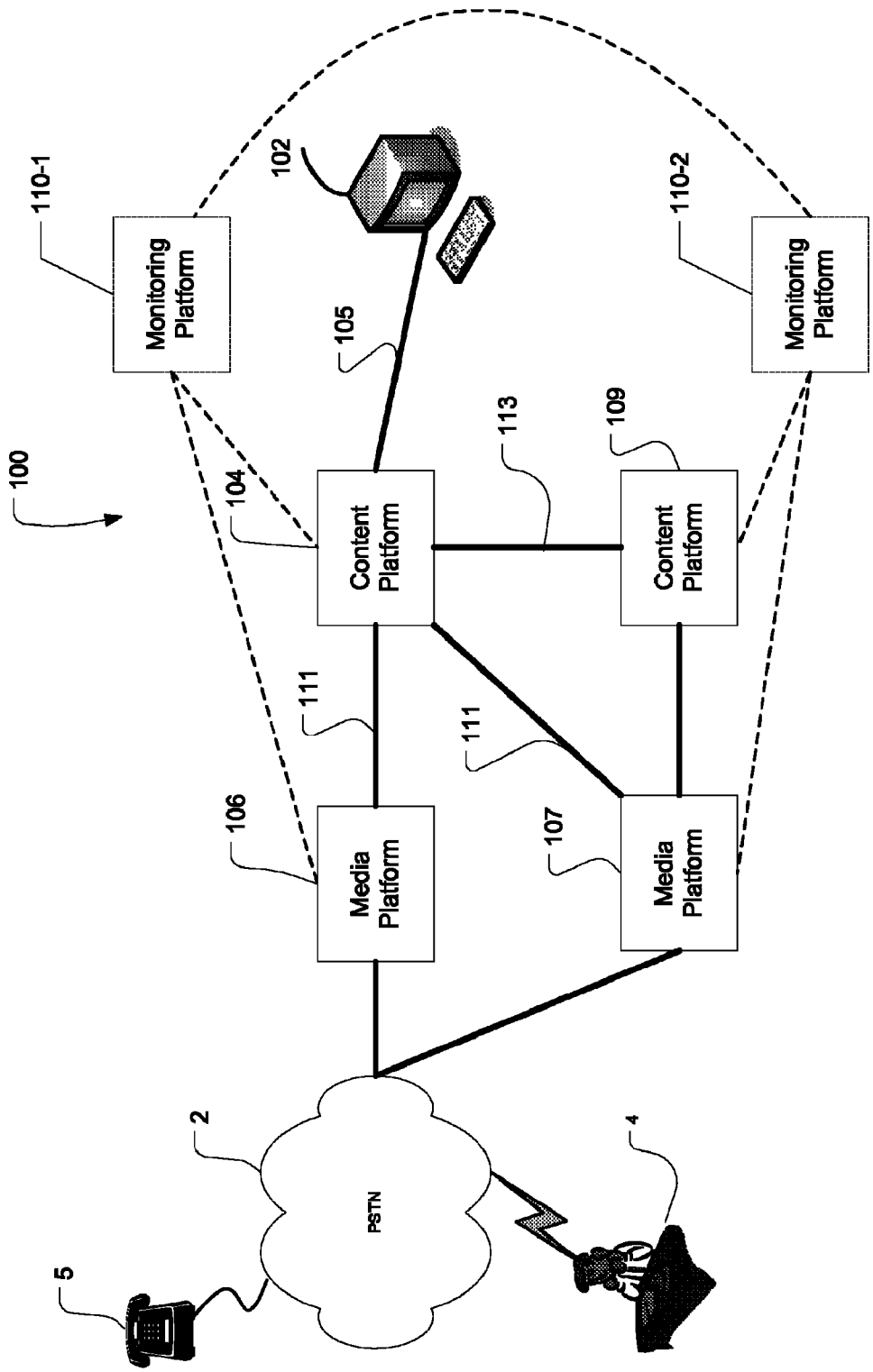
FIG. 1 is a schematic diagram of an outbound call processing and control system according to one or more embodiments in which content and media platforms and links there between are provided in a redundant manner and including redundant service monitoring platforms (shown connected via dashed line links) in one or more alternative embodiments.

With reference to FIGS. 1-4, there is illustrated an embodiment of an outbound calling and redirection system 100 for a telecommunications network. The system 100 may be private or network-based in any network (for example, wired or wireless, local or long distance (inter-exchange) or internet. Referring to FIG. 1, system 100 may include a customer computer 102, a content platform 104, 109, and media platform 106, 107. At any one point in time, it is assumed that a customer computer has two way communication over link 105 to one content platform 104 with call processing control responsibilities. The content platform, in turn, is linked to one media platform, for example, media platform 106 having call processing responsibilities and IVR capabilities. The media platform 106 is primarily responsible for outbound call processing for the customer having customer computer 102 running that customer's application, for example, an election candidate application. The media platform 106 is linked to the public switched telephone network 2 comprising wired and wireless local exchange carriers and inter-exchange carriers and is defined to also include the internet. Media platforms may have direct links (not shown) to live agents forming a live agent pool 4 or connect via the PSTN 2 (shown). Target called parties 5 are typically connected by media platform 106, 107 via PSTN 2 depending on the application.

Monitoring platforms 110-1 and 110-2 are shown and may be provided in an alternative embodiment (as shown in dashed line) for monitoring service performance criteria for a plurality of systems 100 including the system 100 shown. Each component will be described herein. Although FIG. 1 shows a telecommunication/internet network environment, it will be understood that other environments may also be used and which may utilize alternative networks, Voice over Internet Protocol networks, cable television networks or even high speed multimedia packet networks involving streaming video. For example, one or more embodiments of the present invention may use an environment having fewer or more than all of the various aspects shown in FIG. 1.

Various functional aspects of outbound call system 100 may be implemented in the context of data structures, program modules, program or computer instructions executed in a computer implemented environment. Accordingly, one or more aspects of the invention may be embodied in one or more computer systems. By way of example, customer computer 102, content platform 104, 109, or media platform 106, 107 may be implemented with a general purpose computing device in the form of a host computer, including a central processing unit, a system memory, and a system bus that couples various system components including the system memory, to the central processing unit. The system bus may be any one of several types of bus structures including a memory bus or memory controller, a peripheral bus, and a local bus using any one of a variety of bus architectures. The general purpose computing device may have an exemplary operating system such as MICROSOFT WINDOWS®, WINDOWS XP®, UNIX®, or LINUX® or variations thereof. The system memory includes read only memory ("ROM") and random access memory ("RAM"). The general purpose computer device can be any host computer system configured to operate with computing devices.

The operation of computer 102, content platform 104, 109 or media platform 106, 107 can be controlled by a variety of different program modules which may differ from application to application (for example, between a product or service sale application and an election candidate application). Non-limiting examples of program modules are routines, programs, objects, components, data structures, libraries and so on that perform particular tasks or implement particular data types. The aspects of a particular embodiment of a particular application and associated equipment may also be practiced with other computer system configurations, including hand-held devices, multiprocessor systems, microprocessor-based or programmable consumer electronics, network PCS, mini-computers, mainframe computers and the like. Furthermore, an aspect of outbound call system 100 may also be practiced in distributed computing environments where tasks are performed by remote processing devices that are linked through a wireless or wired communications network. In a distributed computing environment, program modules may be located in both local and remote memory storage devices.

Figure 2:
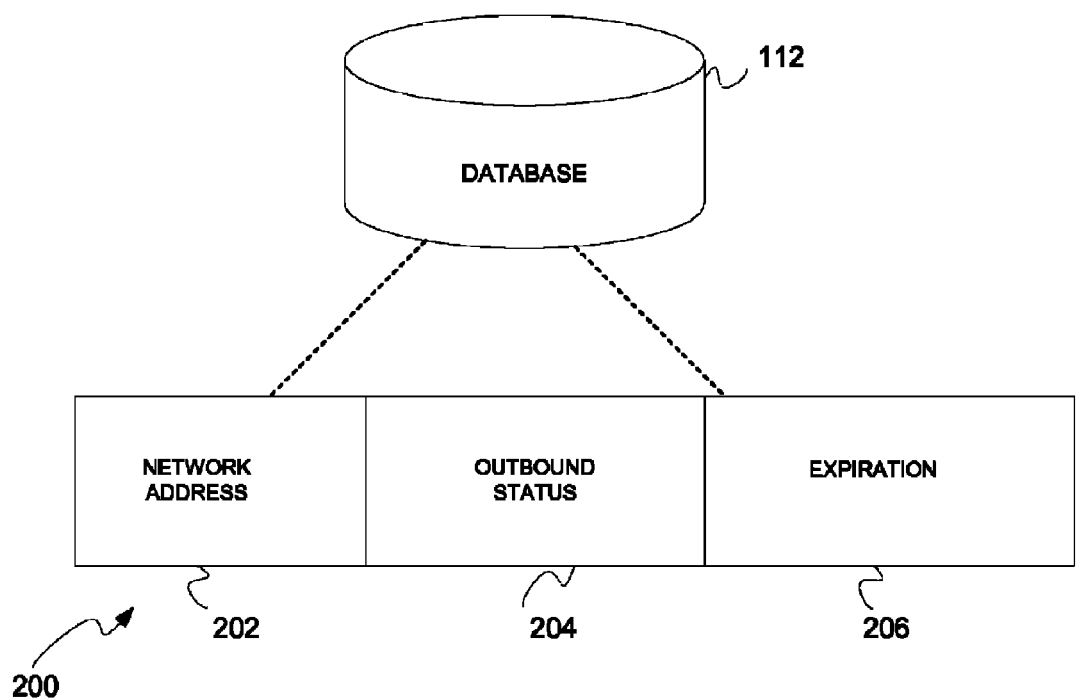
FIG. 2 is a schematic diagram of a content platform database according to one or more embodiments, such that a media platform database may be similarly configured of a portion of the content platform database as necessary.

In one embodiment, customer computer 102 is coupled to content platform 104 via signaling or high-speed data lines 105 utilizing a protocol format such as XML. An exemplary embodiment of one application followed through the detailed description of the drawings may be that of an election candidate at whose offices is located customer computer 102. As shown in FIG. 2, content platform 104, 109 includes a content database 112 comprising at least a computer-readable storage device that may include one or more magnetic disk drives or, alternatively, optical disk drives such as Compact Disk ROMs, or DVD drives or other storage including flash memory. Content database 112 differs for each application and associated computer-readable media provide nonvolatile storage of computer-readable code for that application. Content database 112 for a given application may include a plurality of data records 200 relating to a plurality of telephone service numbers, internet addresses (generally, network addresses) and/or other service data for outbound calling, i.e. outbound status and expiration. As used herein the terms "service data" or "service data package" is the electronic data that may be electronically forwarded to another computer system. This service data is associated with a specific network element (e.g., Content Platform) and can be used in replacement content platforms at a predetermined time of day, in response to a disaster event, for scheduled maintenance events or when real-time service performance criteria do not meet (or exceed) determined thresholds depending on the application to provide seamless service and support of outbound calling features and as further described herein, may be transferred in whole or in part or shared with associated media platforms 106, 107, for example, media platform 106. Not all service data or program modules need be transferred as some service data (or program modules) may be permanently stored at a replacement content or media platform and only a portion of the service data (or program modules) need be transferred, for example, to identify which target called parties remained to be called or had already been called before or within a scheduled switchover. Moreover, a given application program module such as a product selling, election candidate, voting, polling or survey application among the infinite varieties of applications of outbound calling equipment may permanently reside at the replacement content platform or an associated media platform or be uploaded to the replacement content or media platform depending on the application. As used herein a site comprises one content platform and one media platform or comprises a computer capable of handling both call processing control and call processing for directing outbound calls via customer links to target called parties 5 as well as the call query/response script and collection of actual call statistics involving, for example, IVR and live agent resources.

With reference to FIG. 2, in one embodiment, a data record may include but is not limited to a service network address attribute record 202, retrieved outbound calling status attribute record 204, and an expiration attribute record 206. Network address attribute record 202 includes at least a list of target to-be-called parties and their associated attributes, the list referred to herein as network terminating addresses. Retrieved outbound calling status attribute record includes traffic parameter data and service performance ciriteria data which has been collected from media platforms 106, 107 per application. It may record calls in progress, calls completed and success or failure data including what the called party answered in response to queries and other records for analysis. Expiration attribute record 206 is a per application record of expiration data including but not limited to calls not answered, calls transferred to voicemail, calls with hang-up's by called parties after a selected period of time and so on. In accordance with one or another embodiment, schedule service data stored on database 112 may include in any one of records 202, 204 or 206 or an alternative or additional record collection such parameters as call schedule start time and date, a digit string of the Automatic Number Identification of the call, a number of rings associated with a given call (whether a maximum number of rings before expiration or rings until voicemail or rings until answer), number of seconds before a response is provided to a query, number of call seconds, number of calls thrown to voicemail, number of calls requiring an agent, numbers of calls reaching an agent with a called party disconnect within x seconds, number of illogical or incoherent responses and a network address identification of an IVR query or comment or response to play on audio or other schedule service data that may be application dependent. These schedule service data and actual measured parameters related thereto are merely exemplary and may vary from application to application of the outbound calling equipment. Such parameters may be detected and measured and their rates of change over time measured depending on the application and the results accumulated, analyzed and reported by content platform 104 to customer computer 102. It should be noted that content database 112 may be a configured to remote operation using physical and logical connections to content platform 104. In an embodiment, content platform 109 also includes a computer readable database, such as database 112 or at least the hardware capability to store at least a portion of database 112. Moreover, it is preferable for a redirection of call processing responsibility for a similar database or portion thereof that such a database as is depicted in FIG. 2 be likewise provided for media platform 106, 107 and that redundant links 105 be provided to customer computer 102 from a media platform (not shown) for continuous operation during an outage or partial outage of a content platform 104, 109.

In a given application at an original outbound calling site, calls may be dropped after a predetermined number of rings the equipment assuming that the called party is not available or is screening the call. Calls thrown to voicemail may result in IVR or a live agent 4 leaving a voicemail message for called party 5 or be intentionally dropped. The number of calls thrown to a live service agent may suggest that the application needs to learn, for example, via a neural network process how to improve IVR handling and rearrange its questions or provide for different responses. In an election candidate application, there may be thousands of candidates in local and national elections that are calling potential voters. The election candidate may begin: "Please allow me to introduce myself. I am X running for Y as a member of the Z party. Are you familiar with my candidacy? You may speak yes or no or respond by entering 1 for yes or 2 for no followed by the # sign." An alternative first question may be: "Are you a member of the Z party?" Another alternative first question may be: "Habla espanol?" Data on responses to particular queries and intentionally false data such as unintelligible voiced responses can be particularly useful to the political candidate and cause them to change their election candidate computer program application. The number of calls thrown to a service agent, when insufficient agents are available, may suggest the need for more agents. Or to the contrary, the fewer numbers of calls thrown to agents may be a measure of successful outbound calling. The number of calls handled without using an agent with logical responses and apparently satisfied call recipients is clearly a measure of outbound call management success of a given application.

In one embodiment, media platform 106, 107 is coupled to content platform 104, 109 via signaling or high-speed data lines 111 (line 111 between platforms 106 and 109 not shown to simplify the drawing). Media platform 106, 107 are configured to execute one or more application programs which may be, for example, election candidate applications for multiple political candidates or for product or service sales applications for one or more product or service providers. The application programs initiate outbound telephone calling via the telecommunications network 2 to called parties 5 in accordance with network address data 202, retrieving and temporarily storing outbound call status information in record 204 and forwarding accumulated outbound status for each telephone call or group of telephone calls to content platform 104 along with expiration records 206 and other records. In one embodiment, media platform 106, 107 can be embodied in a host computer system configured to operate with devices using the TCP/IP protocol. In alternative embodiments, media platform 106, 107 may host the following software components: a telephony gateway, a voice XML Interpreter and local disk caching. Media platform 106, 107 may also record statistics (per a database 112 of FIG. 2) for each call, including the several parameters mentioned above as well as actual call start time, actual call end time, user-to user identification (UUID) data, Dialed Number Identification Service (DNIS) and/or Automatic Number Identification (ANI) data and numbers of calls handled at one time, in addition to the schedule service data identified above, which may be referred to herein as actual calling data. It should be recognized that the host computer includes networking software and a network interface to send and receive data packets from network 2, such as a voice over internet protocol system (VoIP) network.

Real-time service performance criteria as used herein refers, for example, to traffic criteria and logically deduced call success/failure criteria among other criteria related to actual service performance of a given application. For example, an original site (comprising a content platform and a media platform) that is overburdened with delayed calls and delayed call handling may switch to a replacement site for traffic considerations or an original media platform may request assistance from another media platform. Furthermore, two or more sites or two or more media platforms may elect to utilize a third site or media platform with a different pool of live agents, for example, one located in India.

Fuzzy logic performance criteria evaluation algorithms or modules may be non-application dependent and refer to parameters that are detected and evaluated over time and ignore those that are not detected or measured by a given application. Neural network algorithms permit learning by the application and by the evaluation algorithm module that decides whether to actuate a switchover or not at an original site. Such performance criteria evaluation algorithms and modules may run within system 100 of FIG. 1, preferably at a content platform 104, 109 or at a service monitoring platform 110-1 or 110-2. Consequently, a given replacement outbound calling site or platform may handle a plurality of different calling or call control applications running simultaneously having been uploaded the applications and schedule service data or actual performance data for a variety of reasons, from scheduled maintenance to equipment failure to the failure to meet or the exceeding of real-time service performance criteria thresholds.

In one embodiment and as shown in dashed line in FIG. 1, monitoring platforms 110-1 and 110-2 may be provided anywhere in the world. Monitoring platforms 110-1 and 110-2 may run service performance criteria analysis algorithms and modules for one or more systems 100, in particular, one or more polling, shopping, election candidate, voting, reservation or other outbound calling and redirection application, system or network. Monitoring platforms 110-1 and 110-2 may redundantly monitor at least a portion of the same systems 100 and/or may monitor entirely different systems 100 via the same or different fuzzy logic and/or neural network algorithm. Consequently, a given network system 100 having a content platform and media platform may make a decision to switch all or a portion of call processing or control of call processing or both to an alternate platform or site or rely on a separate monitoring platform 110 to make the decision to switch.

General Operating Process

Figure 3:
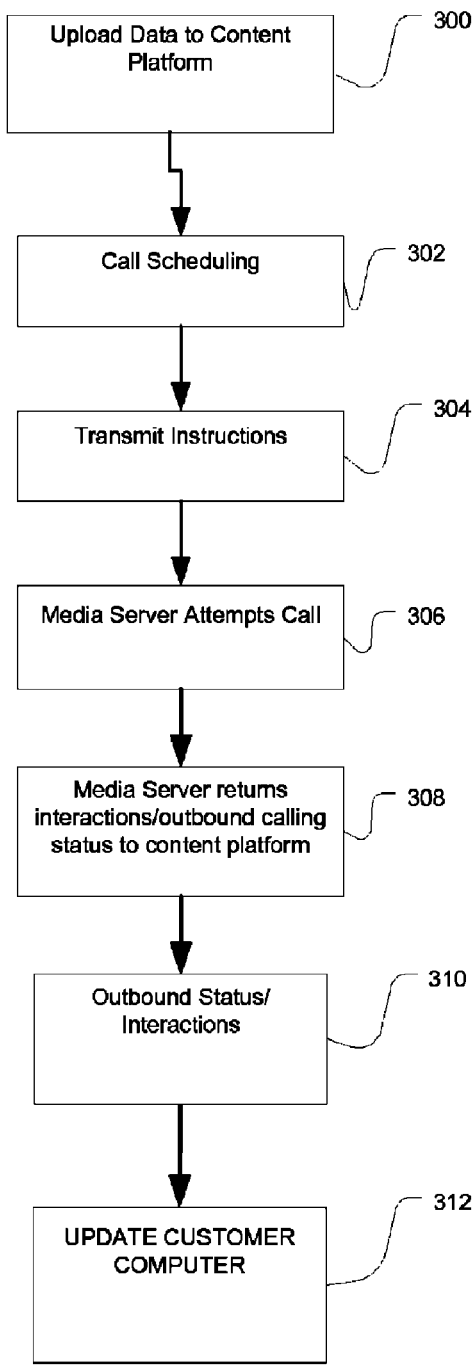
FIG. 3 is a flow diagram illustrating an overall method of processing telephone calls according to one or more embodiments for a given customer of outbound calling services.

FIG. 3 is an overall process flowchart for illustrating one exemplary non-limiting outbound call processing and control method for outbound call processing in telecommunications network 2 of FIG. 1. The inventive method(s) herein may be embodied as computer readable instructions stored on a computer readable medium such as a CD-ROM, DVD ROM, removable storage device, hard disk, system memory, embedded memory, flash memory or other data storage medium. The computer readable medium stores computer executable components, or software modules. More or fewer software modules may alternatively be used. Each component or module may be an executable program, a data link library, a configuration file, a database, a graphical image, a binary data file, a text data file, an object file, a source code file, or the like. When one or more computer processors execute one or more of the software modules, the software modules interact to cause one or more computer systems to perform according to the teachings of this embodiment.

With continued reference to FIG. 3, in step 300, a calling party or their office or political party such as candidate X running for political office or their client service bureau maintains a client customer computer 102. The customer computer 102 uploads a listing of end-user network addresses to content platform 104 for storage in network address record 202 (FIG. 2). A mayor, a city council person candidate and the like may all share the same network addresses and a similar election candidate application running on platforms 104, 106. The network addresses could be voice telephone phone numbers for the PSTN, an internal telephone network or, alternatively, voice data addresses for a Voice over IP system or IP addresses of an IP network. Nevertheless, other types of network access are possible for specific implementations. As an alternative, an uploading signal may comprise a HyperText Transfer Protocol (HTTP) request from a web page uniform resource locator (URL), such as accessing the content platform 104 via the Internet. The web page may be written in a number of ways, such as Hyper Text Markup Language (HTML) or Extensible Markup Language (XML). Other variations of such a HTTP request are contemplated to be within the scope of the invention; such as a security sockets layer type. Further, the uploading signal may also be any appropriate Internet protocol component for network communications for accessing a web site. Occasionally, control signals and commands are transmitted over the same computer 102 to platform 104 link to change query order or respond to decisions about call redirection and the like when a calling party/client is required for decision or for approval of a suggested decision.

In Step 302, the various end-user network service addresses (e.g., voice phone numbers) are scheduled for calling by the content platform 104 according to scheduling data by the content platform via command over links to media platform 106. As is generally known in the art, a typical schedule for attempting calls to homes of working individuals involves the evening hours of 6 PM to 10 PM of a work day in the time zone in which the home is located. The network addresses may be rearranged in different order or simultaneous calls may be made by media platform 106 to handle the traffic within anticipated acceptable levels. For example, a call may be attempted to a given target called party at 3:30 PM. The call may result in a non-voting child answering and saying that their parents are not home. So the call may be rescheduled for 6:00 PM. Then, the given network address is not reached again at 6:02 PM; then, the network address may be attempted that evening or on the following evening at 7:02 PM, until the target called party is successfully reached. In Step 304, the content platform 104 transmits computer readable instructions to the media platform 106 so as to initiate outbound calling based on the scheduling data in the content platform 104 already forwarded in step 302, such as the scheduling data populated in network address records 202 of content database 112. The computer readable instructions comprise a script for query/response as well as instructions for rescheduling calls and recording actual call performance and criteria data for uploading to content platform 106. In Step 306, the media platform 106 attempts to connect to the various end-user network addresses (e.g., terminating address) for telecommunications call processing via the network 2. The media platform 106 records actual call data and any responses to queries for each called party, accumulated actual call performance data, readjusts the calling schedule for the next evening or other period of calling based on what called parties have been successfully reached and forwards accumulated data to content platform 104 for analysis and reporting to customer computer 102. Included in the periodic reports or separate from such reports to computer 102, decisions may be requested about recommended courses of action as the content platform or the service monitoring platform relays through the content platform requests for decisions about actions to take going forward.

In Step 308, media platform 106 may return outbound calling status records 204 and interactions to content platform 104. Each of the media platform 106 and content platform 104 logically maps the status to the specific telephone number address record 202. By interactions in step 308 is meant the queries and responses of a called party if any. This step of forwarding actual call data can be implemented by a transmitted data unit having a network service address attribute record 202, and a payload of the retrieved outbound calling status attribute record 204, for example, completed or not completed, successful or not successful status and any responses provided along with call statistics such as call duration and expiration data records 206. The content platform 104 can read the actual values of the attribute record 204. If a "not completed" status occurs, then schedule the next telephone call to the specific telephone phone number for a predetermined elapsed time or the next day at a different time. For example, the predetermined elapsed time can be based on hour increments, such as one hour, two hour, three hour or four hour increments or, for example, scheduled for the next successive evening one hour later. In other embodiments, the predetermined elapsed times may include minute or second increments in combination with the hour increments. In Step 310, call completion summary data and other updates and decision requests are relayed by the content platform 104 to the customer computer system 102 so, for example, the political candidate is informed on the actual status of the various telephone calls for updating local records and decision making. Also, the customer is asked to input any changes they would like made to the outbound calling process or steps of the query/response script (adding, deleting or rearranging questions to improve call success). For example, the candidate may determine that a particular network addresses has responded that they speak Spanish and, consequently, further urgings for their support by further outbound calls should eliminate the "Habla espanol?" query and provide a Spanish conversant IVR and live agent in future outbound calls. As will be further discussed herein, known data about a called party may contradict responses received. Called party verification may be included as a calling algorithm module used for a given network address to be sure that called party is a target called party and not a guest or family member.

Figure 4A:
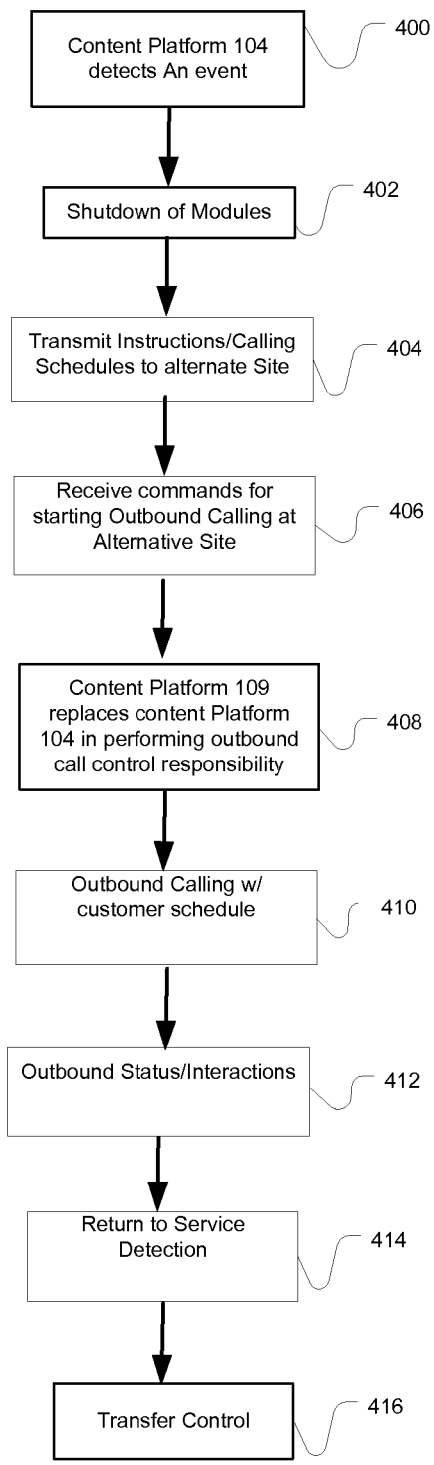
FIGS. 4A and 4B are a flow diagram illustrating methods of processing outbound telephone calls and reallocation of responsibilities among outbound call processing platforms according to one or more embodiments.
Figure 4B:
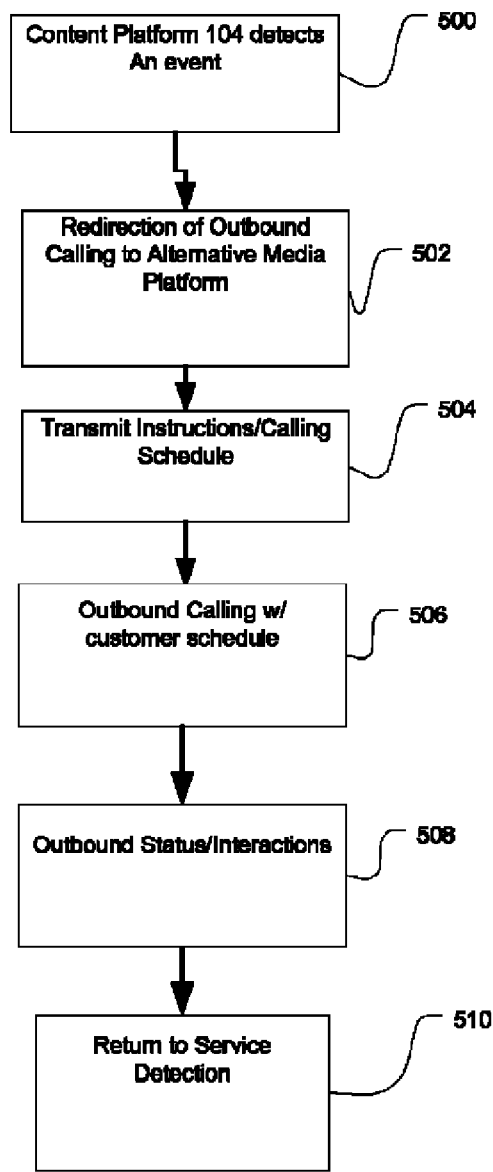

FIGS. 4A-4B illustrates various exemplary non-limiting processing methods for outbound calling in telecommunications network 2. Generally, a computer implemented method, such as an outbound calling scheduler, serves as a redirection tool that supports redirection of the outbound calling capability from a first outbound calling production and control site to another site (e.g., content platform 104 to content platform 109; content platform 104 to media platform 106; media platform 106 to media platform 107 or from one site to another site). A redirection tool may be implemented via a set of computer scripts that can be executed automatically or alternatively by manual methods. In one implementation, the redirection tool can be provided as a computer executable shell script. Accordingly, the redirection tool may be written in any of number shell programming languages. When a site (for example, platforms 104, 106 overseen by monitoring platform 110) supporting the outbound calling and control capability goes into a switchover mode, the scripts execute automatically and switch over the outbound calling capability to the other site (or from one platform to another as appropriate). Further outbound calls are made or controlled from that the new site or platform in the switchover. In another aspect, if there are failures in one outbound calling production site where the outbound calling capability is active, a tool provides scripts that can be executed in order to switch over the outbound calling capability to the other site, responsive to the recognition of failures. In yet another aspect, if there are performance criteria that exceed defined thresholds, such as traffic statistics measured and evaluated at a content platform 104, 109 or a monitoring platform 110 showing an overload condition or call success-failure criteria showing called parties are intentionally trying to tie up the system, indicative of degraded performance at one outbound calling production site where the outbound calling and control capability is active, a tool can autonomously trigger scripts in order to switch over all or a portion of the outbound calling responsibility from one media platform to another or one site to another or the control responsibility from one content platform to another or temporarily to a media platform, responsive to the recognition of degraded performance, or other reason. Once the performance criteria returns within predetermined thresholds or as the originating site learns to better handle the traffic so that the thresholds are maintained, then, the schedule service data and/or the control responsibility associated with customer relations may resume to be handled by the original platform or site. As already introduced, a number of original sites or platform types (content, media or monitoring) may share one replacement site or platform (for example, an international site/platform in India) on an as needed basis and use different replacement site/platforms for running different applications and use different associated schedule service data, the replacement site/platform also potentially determining when to switch traffic back to an original site/platform for different reasons (for example, a natural disaster occurring in the vicinity of a replacement site in India).

A redirection tool, in computer readable code, operates to launch outbound calls by sending requests to the internal/external content platform 104, 109 that are configured for outbound calling control. In one embodiment, the content platform 104, interacts with media platform 106 to identify a server with an available outbound port and then launches a first outbound call. A different content platform 109 running the same or a different redirection tool may be transferred control responsibility for the next outbound call via media platform 106. Once the second call is completed, the content platform 109 may update the status of the outbound call in outbound status record 204 of content platform 104 or its own status record or both as received from media platform 106 depending on the application.

In another embodiment, if the content platform 104 at a local site having media platform 106 and content platform 104, is not available, a redirection tool automatically accesses a content platform 109 at an alternate site and attempts to launch calls at the remote site, media platform 107, content platform 109 or still using media platform 106 for a portion of outbound call launch. If a local content platform 104 cannot access a media platform 106 with available outbound port capacity, the content platform 104 sends that status accordingly to a scheduler. The redirection tool then automatically directs the request to the content platform 109 at the alternate site which may be able to access media platform 106 or, failing that connection, use alternative media platform 107 for outbound call launch.

With reference to FIG. 4A, there is shown an overall flowchart for outbound call redirection management. In Step 400, the redirection process may be initiated in a number of ways, such as initiation in a predefined time frame by a computer program or by user or manual initiation or autonomously, for example, upon detection of an equipment failure a natural disaster or in response to performance threshold evaluation by a computer program, for example, a performance evaluation program module which may comprise a neural network learning program. For example, content platform 104 (or monitoring platform 110) constantly evaluates the performance of the outbound calling site, algorithms and scripts according to a set of criteria and parameters and determines that service thresholds are exceeded or are not met or detects that the outbound calling site has encountered an event, such as a maintenance mode, or other scheduled or unscheduled event such as a natural disaster or equipment or facility failure. In Step 402, content platform 104 may perform a controlled shutdown of certain of the outbound calling modules of media platform 106 and begin transfer to another media platform of outbound call responsibility by transferring call schedule data or take other responsive action depending on the event or performance evaluation. In Step 404, content platform 104 having a computer module, transmits at least a portion of the outbound calling schedule service data in database 112 to content platform 109 or media platform 106 or alternate site, media platform 107/content platform 109. This can be accomplished, for example, by way of a program to log into content platform 109 over a network, to execute control commands remotely for controlling, for example, media platforms 106 or 107 or both. Alternatively, responsibility may be shifted by content platform 109 downstream on a temporary basis to media platform 106 which in turn may request media platform 107 to assist in carrying out call schedule data in an efficient manner (for example, when media platform 106 alone may fall way behind schedule if not assisted by media platform 107). In this way, data integrity and seamless transfer of services are performed to provide reliable efficient operations. Further, a program can move necessary files or portions of files (e.g., schedule service data or computer program modules) from content platform 104 to content platform 109 or to one or more media platforms 106, 107 or to an entirely different site, 109, 107 via a secure connection.

In one non-limiting example, the database 112 may have a login attribute of the content platform, a network address attribute of the content platform, user identification attribute, and/or secure password identification attribute for login permissions. In one example, a target identifier attribute may be in the form of a network element logical name. A network address attribute may be any appropriate network address for communicating with a network element, such as a network address for content platform 109. In one arrangement, a network attribute address may be a TCP/IP address on a telecommunication network. A user identification attribute may include a specific username of a system employee for access to the platform data. The secure password identification attribute provides ability for the user to obtain secure login access to the new content platform, media platform or site or monitoring platform. In one example, secure shell protocol (SSH) for network communications can be used in the present system. Nevertheless, other ways for communications are possible.

In Step 406, content platform 104 can issue one or more computer readable commands or instructions to content platform 109 so as to initiate outbound calling control features on content platform 109 and call processing via media platform 106 or 107 or both. In Step 408, content platform 109 performs at least a portion of allocated outbound calling control operation in place of content platform 104 of call scheduling and reporting to computer 102 as discussed in the foregoing with respect to FIG. 3. In Step 410, content platform 109 issues an HTTP request to media platform 106 or media platform 107 or both media platforms to perform outbound calling in accordance with customer/client scheduling parameters received from content platform 104, and of course, assuming no link failures among platforms. In Step 412, media platform 106 continues or media platform 107 begins either in place of media platform 106 or in addition to platform 106 to perform outbound calling and to record interactions and data. In Step 414, there may be various interactions between the called party and one or the other or both media platforms 106, 107 in accordance with scheduling data, hopefully meeting scheduling performance criteria. Media platform 106 and/or media platform 107 report actual call response and expiration data to replacement platform 109 for summary and delivery to computer 102, i.e. return to service detection. In Step 416, content platform 104 (or content platform 109 can negotiate with content platform 104 to assure its proper performance after platform 104 accepts the return of control responsibilities at content platform 104) can detect a return to service event or performance criteria within thresholds and executes a computer readable command to content platform 109 so as to transfer outbound calling control information for operation to content platform 104. If appropriate, control platform 104 or 109 controls the return of call processing to media platform 106 from media platform 107.

With reference to FIG. 4B, there is shown and will be described an alternative redirection process involving a switching of call control responsibility downstream toward the called parties 5 or a switching of call processing responsibility from media platform 106 to media platform 107 or to both media platforms 106 and 107. In Step 500, the redirection process may be initiated in a number of ways, such as initiating automatic methods via a computer at content platform 104 or under control of monitoring platform 110. For example, content platform 104 constantly evaluates the performance of the outbound calling site 100 including its associated media platform 106 according to a set of criteria or parameters that may be application specific. As a result, content platform 104 may determine that service criteria thresholds are exceeded or cannot be met or detects that the outbound calling site 100 has encountered an event, such as a failure in the media platform 106, facility or link failure, scheduled maintenance or other switchover triggering event such as a traffic overload condition. In Step 502, content platform 104 may redirect the next outbound calling request to media platform 107 and, if there is a problem with continuing to provide control functionality, may temporarily transfer outbound calling control functionality to media platform 106 or to media platform 107, for example, if content platform 109 has failed and content platform 104 becomes overloaded. In Step 504, content platform 104 having a computer module for controlling data transfer, may transmit at least one set of outbound calling schedule service data in its database 112 to media platform 107, leave resident some outbound calling schedule data at media platform 106 and possibly transfer some computer program call processing control modules to media platform 106 or 107 depending on whether or not there has been a failure in media platform 106 or content platform 109. This can be accomplished, for example, by way of an HTTP request. In this way, data integrity and seamless transfer of services are performed to provide reliable efficient operations.

As an example of a threshold determination where real-time service performance criteria either suggest call failure (call success), first consider the application of the outbound calling equipment. Applications, as described earlier, may be many and varied, for example, an election candidate, polling or voting application or opinion survey. Nevertheless, while applications may vary, a real-time service performance engine or module may be fashioned that may be universally utilized by outbound calling originating sites 100, for example, site 104, 106, alternate site 109, 107, or monitoring platforms 110, evaluate whatever parameters are in fact measured by the different applications and, using fuzzy logic and neural network analysis techniques, make decisions to switch a portion of data and control to an alternate replacement site, switch tasks to the same type of different platforms or take other remedial measures. Such a real-time service performance engine may run within the network 100 at a media platform 106, 107 or, more preferably at a content platform 104, 109 which is more likely to have specific application contact with, for example, the election candidate, via communications to from the election candidate's computer 102. In an alternative embodiment or as a supplement to this embodiment, real-time performance engines may run from monitoring platforms 110-1, 110-2 for multiple sites 100 or platforms.

Figure 5:
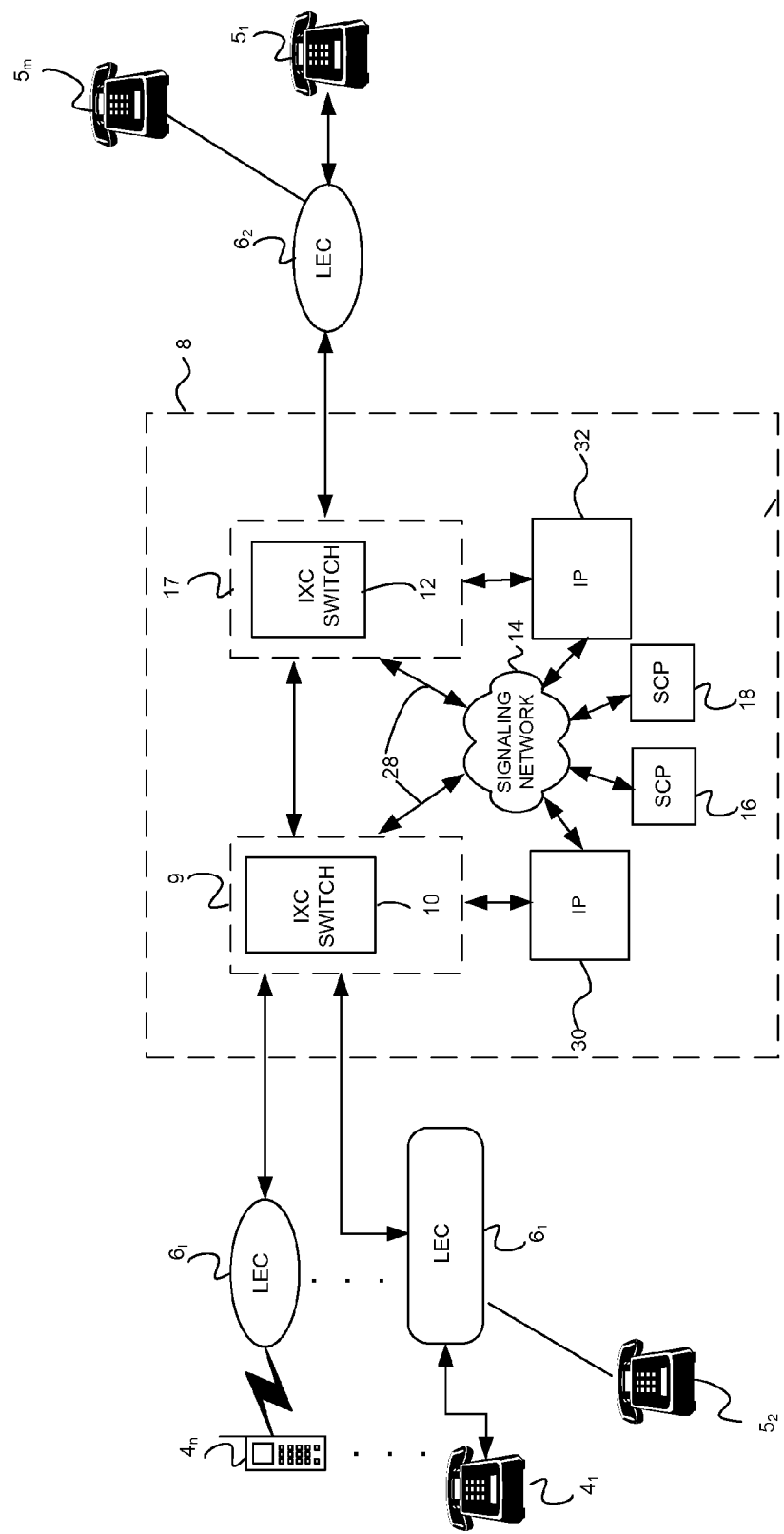
FIG. 5 is a schematic diagram of a telecommunication network environment in which one or more embodiments of the invention may be implemented.

For example, decisions may be made that traffic is too heavy at an originating site 100. Traffic is historically measured in hundreds of call seconds or Erlangs and can be used, as is known in the art, for example, to determine or optimize service agent waiting time or physical use of shared equipment such as IVR voice interpreter/receiver hardware and software resources. Not enough agents in an agent pool 4 being accessible at an originating site for the given amount of traffic could result in conclusions that the application, such as an election candidate, polling or voting application, is faulty, more service agents are needed and/or that called parties 5 are intentionally tying up the system. The PSTN 2 may be tied up with other traffic such that there are excessive call processing times within PSTN 2 so that call schedule data may begin to reflect delays in making sufficient calls to keep up with the calling schedule. Another conclusion may be that a query/response script is faulty, must be updated for the next call to one called party or calls to the entire target collection of called parties 5 for the application. The decision made that there exist at a given time a number of called parties that are intentionally tying up an original outbound calling system with intentionally illogical responses or intentionally delaying calls or hanging up when a service agent is reached could result in the application learning from the illogical responses and the like. A decision may be made in favor of a temporary switchover of traffic to an alternative site or to use a second media platform on a temporary basis, locating more service agents or take other remedial measure. An aspect of the invention per FIG. 5 is to provide common universal software at Steps 502 and 504 to logically deduce what is happening that causes a threshold in real-time service performance criteria to not be met or exceeded. The universal software may select among a plurality of possible resultant actions such as a switchover to an alternate replacement site, use an additional media platform for calling or content platform for call control or take other action such as change the algorithm or the schedule data or modify the query/response script for a given application. The universal software may wait for resolution of PSTN 2 problems or use an alternative network to the PSTN until a threshold or a combination of thresholds returns to within determined boundaries for the thresholds expected for a generic application.

In Steps 506-508, content platform 109 performs outbound calling control operation at least in part replacing content platform 104 of an original site as discussed in the foregoing with respect to FIG. 3 in concert with media platform 107 or media platform 106 or using both media platforms 106, 107 to provide call processing and some control tasks. Content platform 109 may even call upon a third or additional media platform to assist (not shown) and in accordance with customer/client scheduling parameters in its database 112 or an additional content platform not shown in FIG. 1 to assume some control responsibilities. Finally, in Step 510, content platform 104 (or content platform 109) can detect a return to service event and executes a computer readable command to redirect outbound calling schedule data to media platform 106, for example, from media platform 107 when a scheduled maintenance event has been fully performed or outbound calling performance criteria again met.

General Network Environments

By way of example, the network outbound call system 100 discussed above in connection with FIGS. 1-5 is operatively connected via physical and logical connections to a telecommunication network (PSTN) 2 as discussed above. FIG. 5 illustrates a schematic diagram of a typical telecommunications network 2, including an Advanced Intelligent Network (AIN) for providing telephone service to one or more customers $5_1, 5_2 \ldots 5_m$ (where m is an integer and represents the number of customers). The agent pool $4_1, 4_2 \ldots 4_n$ where n comprises a smaller number of resources than m customers. The customer computer 102 may be regarded as a customer terminal 5. The outbound call system 100 provides network-based customer-related call log information upon a request from the customer via computer 102. The operation of the PSTN network 2 will be briefly described.

With continued reference to FIG. 5, network 2 (FIG. 1) may include a plurality of Local Exchange Carrier Networks (LEC) $6_1, 6_2 \ldots 6_1$, each providing local POTS service to a corresponding one of the telephony devices, including wireless phones connected to LEC $6_1$ where 1 is a number typically less than the number of customers 5. For example, LEC $6_1$ comprises one or more Service Switching Points (SSP) 7 including local switches with associated software to process and route a plurality of telephone calls made by the customers. Regarding LEC $6_1$, customer $5_m$ may make and receive calls through an individual cell site (not shown) or a succession of cell sites connected to one of a pair of Mobile Telephone Switching Offices (not shown). While FIG. 5 suggests a separate LEC for each customer, FIG. 5 is greatly simplified. A single LEC 6 may include a plurality of local switches, IP servers or ATM switches and may serve a plurality of individual customers for wire-line or wireless services.

In the illustrated embodiment of FIG. 5, customers $5_1, 5_2, \ldots 5_m$ using long distance telephone service receive such service from an Inter-eXchange Carrier (IXC) network 8 of their choice, such as the network maintained by AT&T Corp. The network 8 includes at least one, and typically a plurality of, interconnected toll switches, represented by the switches 10 and 12 embodied in remote Service Switching Points (SSP) 9 and 17 that are linked to at least one LEC 6. Although FIG. 5 depicts only the two toll switches 10 and 12 within the IXC network 8, the IXC network 8 may typically include a plurality of such interconnected switches 10, 12. In an example, customer $5_1$ (for example an election candidate) makes an outgoing long distance call to a target call recipient, customer $5_2$. Each toll switch, such as switch 12, that is linked to a LEC, such as LEC $6_2$, routes the call received from its associated LEC to another toll switch, for example switch 10, within the network 8. The receiving toll switch (e.g., switch 12) routes the call to the destination LEC (e.g., LEC $6_1$) either directly, if the switch serves that LEC, or through one or more intermediate switches and facilities (not shown).

SCP's 16 and 18 include a plurality of service package applications that are used for providing advanced telecommunications services to the subscribers via the AIN. Signaling network 14 links the SSPs 9, 17 and SCPs 16, 18 for providing the advanced telecommunications services. The signaling network includes hardware and software for transmitting call control information between the toll switches and intelligent peripherals IP 30, 32, or other specialized resources, as is known in the telephony art. It should be appreciated that the signaling network may include high bandwidth data lines 28, such as OC-3 ATM lines for sending control information. The signaling network employs software, such as Signal System No. 7 (SS7), for signaling protocols, which is known to those skilled in the telephony art.

A given outbound calling site is not completely shown in FIG. 5. Only some live agents 4 are shown. These are connected to a media platform 106, where media platform 106 is typically located within the boundaries of IXC carrier 8. In fact outbound calling sites 100 comprising content platforms 104, 109, media platforms 106, 107, combination platforms and monitoring platforms 110 as per FIG. 1 and replacement sites may be located in local exchange carriers, inter-exchange carriers or in international networks.

Figure 6:
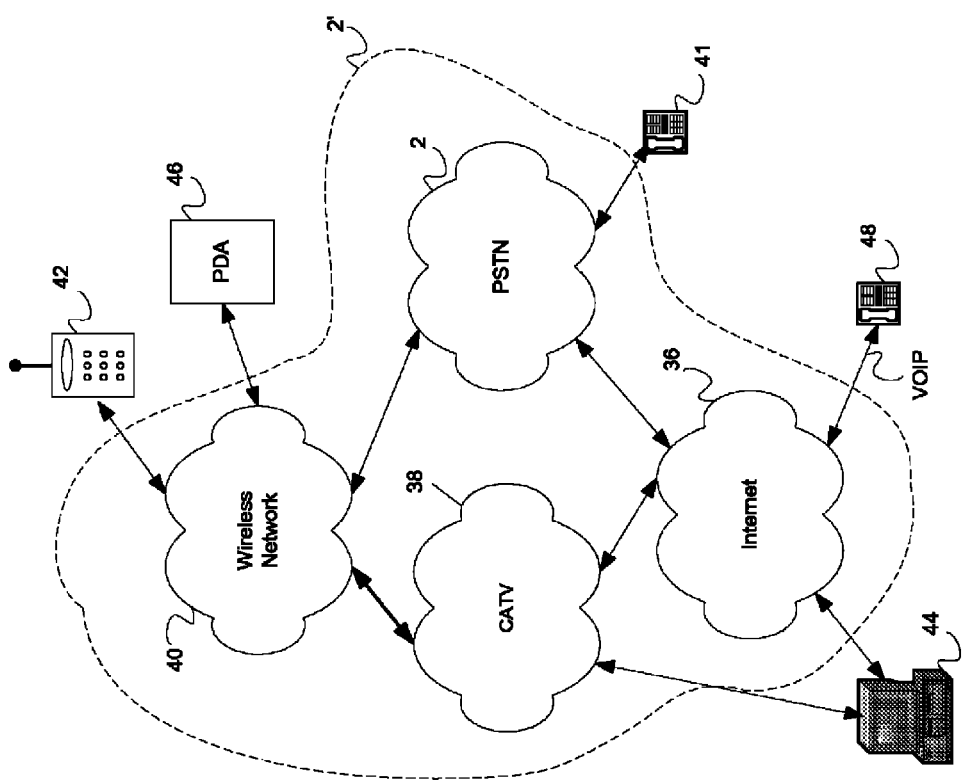
FIG. 6 is a schematic diagram of an alternative telecommunication network environment to the environment of FIG. 5 in which one or more embodiments of the invention may be implemented.

In other embodiments shown in FIG. 6, a communications network 2' may include other sub-networks or alternative multi-media networks that may be implemented with site 100 of FIG. 1, that is, other networks comprising content platforms, media platforms and monitoring platforms. For example, video telephone systems are also contemplated, such as systems operating over broadband CATV networks 38, including coaxial or fiber optics networks in which a video message may be provided to the subscriber 5 receiving the outbound call, such as customer 44 shown with a computer apparatus. In this embodiment of FIG. 6, an outbound video call status database can be provided, for example, by the CATV network 38 for video calls. Media platform 106, 107 in FIG. 1 then may include a video portion, for example, delivered by the election candidate themselves and video call responses and call statistics collected for voice/video actual call performance status data. Further, in a Voice over Internet Protocol (VoIP) environment, such as Internet network 36 in connection with IP protocol enabled telephone 48, a softswitch, a software call agent, or media gateway controller (not shown) can provide the call processing similarly to the Media platform 106 of FIG. 1. Alternatively, an embodiment of the present invention can be implemented in a switched data packet network (such as an ATM network, not shown) that provides end-to-end voice-over-packet telephony, similar to VoIP. Alternative embodiments include call status in a wireless communications network 40 for a mobile phone 42 or for a personal digital assistant (PDA) 46, for example. Rather than voice, short message service (SMS) may be used or query/response to the mobile devices 42.

The foregoing detailed description has set forth various embodiments of the devices and/or processes via the use of block diagrams, flowcharts, and examples. Insofar as such block diagrams, flowcharts, and examples contain one or more functions and/or operations, it will be understood by those within the art that each function and/or operation within such block diagrams, flowcharts, or examples can be implemented, individually and/or collectively, by a wide range of hardware, software, firmware, or any combination thereof. In one embodiment, the aspects may be implemented via Application Specific Integrated Circuits (ASICs). Those, however, skilled in the art will recognize that the embodiments disclosed herein, in whole or in part, can be equivalently implemented in standard Integrated Circuits, as a computer program running on a computer, as a program running on a processor, as firmware, or as virtually any combination thereof and that designing the circuitry and/or writing the code for the software or firmware would be well within the skill of one of ordinary skill in the art in light of this disclosure.

Although the scope of the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations and even some elements described but not specifically shown in the drawings. It will be apparent to those skilled in the relevant technology, in light of the present specification, that alternate combinations of aspects of the invention, either alone or in combination with one or more elements or steps defined herein, may be utilized as modifications or alterations of the invention or as part of the invention itself. It may be intended that the written description of the invention contained herein covers all such modifications and alterations.

What is claimed is:

1. A method of outbound call processing in a telecommunications network, comprising:
   storing, in a memory of a content platform, a plurality of schedule service data associated with a plurality of network terminating addresses;

determining, at the content platform, during a connectivity session between the content platform and a first media platform configured for interactive voice response for outbound calling, available outbound port capacity of the first media platform;

if the outbound port capacity of the first media platform is not available, transmitting to an outbound calling scheduler a request for redirecting outbound calling capability from a first outbound call production platform to a second outbound call production platform.

2. The method of claim 1, the schedule service data comprising at least two of outbound call start time and date, a digit string of an automatic number identification for an outbound call, and a number of rings associated with an outbound call to a network terminating address.

3. The method of claim 2 further comprising determining outbound call completion responsive to outbound call monitoring and storing outbound call completion for a network terminating address in an outbound call status attribute record.

4. The method of claim 3 further comprising, if a "not completed" outbound call completion status occurs, scheduling a next outbound call to the network terminating address for a predetermined elapsed time.

5. The method of claim 1, the connectivity session being performed using a secure shell protocol.

6. The method of claim 1, further comprising performing a controlled shutdown of outbound calling modules responsive to an event.

7. The method of claim 1 wherein the first outbound call production platform comprises the content platform and the second outbound call production platform comprises one of a second content platform and a second media platform.

8. The method of claim 1 wherein a first outbound call production site comprises the content platform and the first media platform and a second outbound call production site comprises a second content platform and a second media platform, the first and second outbound call production sites running a different selected application program.

9. The method of claim 6, wherein the event comprises an event having a start time and an end time, further comprising redirecting outbound call calling capability from the second outbound call production platform to the first outbound call production platform after the end time of the event.

10. The method of claim 1 further comprising iteratively processing outbound calls to network terminating addresses and updating an outbound call status attribute record.

11. The method of claim 1 further comprising storing an expiration attribute record for an outbound call to a network terminating address.

12. The method of claim 1 wherein the first media platform records statistics for an outbound call including actual start time, call end time and automatic number identification data of a called network terminating address.

13. The method of claim 1 further comprising receiving an uploaded listing of network terminating addresses at the content platform from a customer computer.

14. The method of claim 1 further comprising transmitting computer readable instructions from the content platform to the first media platform.

15. The method of claim 8 further comprising transmitting customer/client scheduling parameters from the second content platform to the second media platform for performing outbound calling from the second media platform.

16. A method of telecommunications outbound voice call processing, comprising the steps of:

storing a plurality of schedule service data associated with a plurality of network terminating addresses at a content platform, processing an outbound call in a telecommunication network at a first media platform configured for interactive voice response, responsive to the occurrence of an event, transmitting electronically at least one of the schedule service data to a second media platform and a command to a second media platform to initiate outbound calling functions thereon in response to receipt of the at least one of the schedule service data; and performing outbound calling in the telecommunications network using the transmitted schedule service data associated with the content platform at the second media platform.

17. The method of claim 16, wherein the at least one schedule service data includes at least two of outbound call start time and date, a digit string of an automatic number identification of an outbound call, and a number of rings associated with an outbound call.

18. The method of claim 16 further comprising determining outbound call completion responsive to outbound call monitoring and storing outbound call completion for a network terminating address in an outbound call status attribute record.

19. The method of claim 18 further comprising, if a "not completed" outbound call completion status occurs, scheduling a next call to the network terminating address for a predetermined elapsed time.

20. The method of claim 16, wherein the event comprises an event having a start time and an end time, further comprising redirecting outbound call processing from the second media platform to the first media platform at the end time of the event.

21. A system of computer executable components for outbound call processing in a telecommunications network, comprising:

a module configured for an interactive voice response system for outbound voice calling in a telecommunications network;

a module configured for retaining a plurality of schedule service data associated with a plurality of network terminating addresses, the module for processing an outbound call in a telecommunication network;

a module for monitoring available outbound port capacity; and an outbound calling schedule module including a call redirection tool configured for establishing a connectivity session between a content platform and a media platform configured for interactive voice response, the call redirection tool responsive to outbound port capacity not being available, redirecting at least one schedule service data from a first media platform to a second media platform.

22. The system as recited in claim 21, the redirection tool for further redirecting outbound call control from a first content platform to a second content platform.

* * * * *